(12) United States Patent
Sheinker et al.

(10) Patent No.: US 10,209,074 B2
(45) Date of Patent: Feb. 19, 2019

(54) MAGNETIC BEACON SELF-LOCALIZATION USING MOBILE DEVICE MAGNETOMETERS

(71) Applicant: THE REGENTS OF THE UNIVERSITY OF MICHIGAN, Ann Arbor, MI (US)

(72) Inventors: Arie Sheinker, Ann Arbor, MI (US); Mark B. Moldwin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 129 days.

(21) Appl. No.: 15/050,554

(22) Filed: Feb. 23, 2016

(65) Prior Publication Data

US 2016/0245638 A1 Aug. 25, 2016

Related U.S. Application Data

(60) Provisional application No. 62/119,298, filed on Feb. 23, 2015.

(51) Int. Cl.
*G01C 21/00* (2006.01)
*G01C 21/20* (2006.01)

(52) U.S. Cl.
CPC ......... *G01C 21/005* (2013.01); *G01C 21/206* (2013.01)

(58) Field of Classification Search
None
See application file for complete search history.

(56) References Cited

U.S. PATENT DOCUMENTS

| | | | | |
|---|---|---|---|---|
| 3,868,565 A * | 2/1975 | Kuipers | .................... | F41G 7/00 318/16 |
| 3,983,474 A * | 9/1976 | Kuipers | .................... | G01S 1/42 324/207.18 |
| 4,054,881 A * | 10/1977 | Raab | ...................... | G01B 7/004 324/227 |
| 5,307,072 A * | 4/1994 | Jones, Jr. | .................. | F41G 3/08 324/244 |
| 6,549,004 B1 * | 4/2003 | Prigge | ....................... | G01S 5/00 324/207.17 |
| 2009/0222208 A1 | 9/2009 | Speck | | |

(Continued)

*Primary Examiner* — Tom Thomas
*Assistant Examiner* — Steven B Gauthier
(74) *Attorney, Agent, or Firm* — Harness, Dickey & Pierce, P.L.C.

(57) ABSTRACT

A computer-implemented method for determining position of a mobile device using magnetic beacons including detecting, by a sensor in the mobile device, a magnetic signal having a unique signature associated with a given magnetic beacon; storing location and an associated signature for each of a plurality of magnetic beacons in a data store of the mobile device, where each of the magnetic beacons is assigned a different signature; extracting the unique signature from the magnetic signal; comparing the extracted signature to each of the signatures stored in the data store; identifying a given magnetic beacon from the plurality of magnetic beacons, where signature for the given beacon matches the extracted signature; and retrieving the location for the given magnetic beacon for the data store and correlating location of the mobile device with the location of the given magnetic beacon.

11 Claims, 10 Drawing Sheets

(56) References Cited

U.S. PATENT DOCUMENTS

| | | | |
|---|---|---|---|
| 2013/0116970 A1* | 5/2013 | Dolgin | G01V 3/10 702/152 |
| 2013/0177208 A1* | 7/2013 | Haverinen | G01C 21/206 382/103 |
| 2014/0229103 A1* | 8/2014 | Mirov | G01C 21/08 701/525 |
| 2014/0239943 A1 | 8/2014 | Sheinker et al. | |
| 2015/0018018 A1* | 1/2015 | Shen | H04W 4/04 455/457 |

* cited by examiner

MAGNETIC BEACON SELF-LOCALIZATION USING MOBILE DEVICE MAGNETOMETERS

CROSS-REFERENCE TO RELATED APPLICATIONS

This application claims the benefit of U.S. Provisional Application No. 62/119,298, filed on Feb. 23, 2015. The entire disclosure of the above application is incorporated herein by reference.

FIELD

The present disclosure relates to magnetic beacon self-localization using mobile device magnetometers.

BACKGROUND AND SUMMARY

This section provides background information related to the present disclosure which is not necessarily prior art. This section also provides a general summary of the disclosure, and is not a comprehensive disclosure of its full scope or all of its features.

Outdoor navigation using GPS receivers installed in various types of consumer electronics devices, especially smartphones and tablet computers, has become very common. However, indoor navigation can be problematic as GPS signals are blocked by ceilings and building walls and accuracy is on the order of building dimensions.

According to the principles of the present teachings, an array of magnetic beacons is used for localizing a receiver equipped with a magnetic sensor. A mobile device, such as but not limited to a smartphone or a tablet computer, with an internal magnetometer can be employed as a receiver. Exploiting smartphones and tablets for indoor navigation is a great advantage when considering convenience, simplicity, and low cost. In some embodiments, the navigation area is covered by magnetic beacons deployed in known locations. Each beacon generates an AC magnetic field with a unique signature enabling the receiver to distinguish between beacons. The signature may feature a specific single frequency tone, a combination of frequencies, or any other modulated signal. A software application running on the receiver enables self-localization by means of detection and identification of the nearest beacon. A system prototype has been developed and used to test the method of the present teachings in field conditions. Experimental results show successful localization, which paves the way for a full scale development of an effective indoor navigation system. The good results together with simple implementation make the method of the present teachings attractive for a wide range of indoor localization applications, including: pedestrian and robot navigation, in building rescue missions, vision impaired assistance, and location aware services, just to mention a few.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a beacon detector according to some embodiments of the present teachings, which comprises a triple of non-coherent lock-in detectors, all tuned to the beacon's frequency f1. The outputs of the tri-axial magnetic sensor are prefiltered and then used to feed the lock-in detectors, where each lock-in detector is associated with a different axis. A HPF is used for the prefilter, suppressing low frequency magnetic noise and interferences.

FIG. 2 illustrates that the detection zone has a shape that can be approximated by a prolate ellipsoid, with semi-minor axes of length D, and a semi-major axis of length $\sqrt[3]{\sqrt{2}D}$, where the semi-major axis is in the direction of the coil's magnetic moment. The inner ellipsoid corresponds to a threshold value of 1,800 nT, whereas the outer ellipsoid corresponds to a threshold value of 600 nT.

FIG. 3 is a graph illustrating the spectral density of the magnetic field measured at office using iPad 3 internal magnetic sensor.

FIG. 4 is a graph illustrating the frequency response of the combined filter including the HPF prefilter and the lock-in detector. The HPF is a 1st order Butterworth IIR digital filter. The lock-in detector is tuned to a frequency of 8 Hz, where the LPF is implemented using a simple summation with an integration period of 1 sec.

Corresponding reference numerals indicate corresponding parts throughout the several views of the drawings.

DETAILED DESCRIPTION

Figure 1:
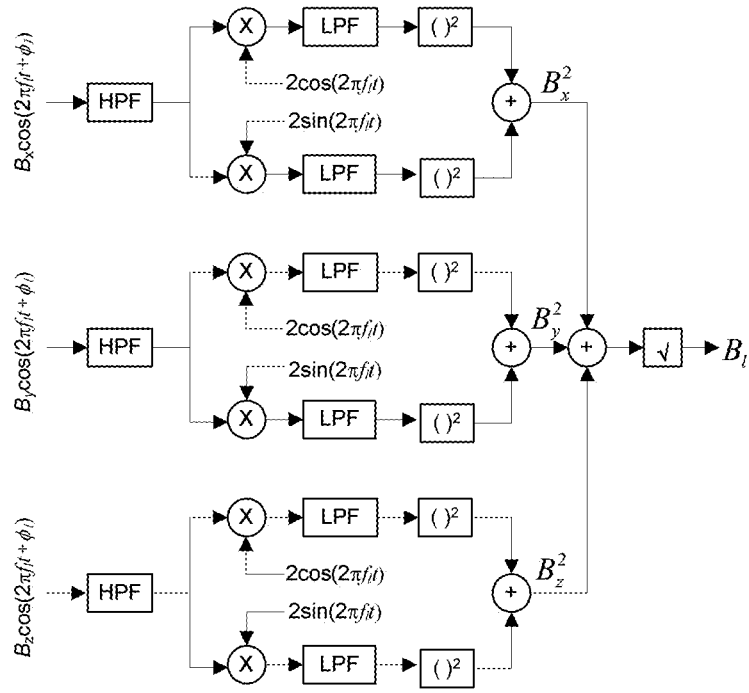

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

1. INTRODUCTION

In recent years, outdoor navigation using GPS receivers installed in various types of consumer electronic devices, such as smartphones and tablet computers became common. However, indoor navigation faces difficulties since GPS signals are blocked by ceilings and building walls. Many efforts have been exerted to develop indoor localization techniques based on electromagnetic waves including Bluetooth, Wi-Fi, cellular, and broadcast FM radio, with receivers integrated into smartphones and tablets. Nevertheless, besides operating in an already overcrowded frequency bandwidth, these techniques usually suffer from blocking and multi-path interferences, reducing localization capability. In addition, Wi-Fi based navigation requires mapping of Wi-Fi hot spots, and Bluetooth beacons are proximity detectors and open up privacy issues. Other approaches such as artificial vision utilizing cameras, and acoustic waves utilizing microphones, rely on line-of-sight and therefore suffer from similar limitations.

Most modern smartphones and tablets include a low cost, low resolution magnetometer based on the Hall effect sensor or a magnetoresistor, which may be exploited for navigation. Traditional approaches for magnetic indoor navigation have been focused on the DC magnetic field. A well-known application is a compass which relies on the Earth's magnetic field for heading. Navigation can be performed by combining a compass with an inertial navigation system (INS), or the dead reckoning technique. Although implemented effectively in many applications, this method suffers from cumulative errors caused by INS drifts and dead reckoning inaccuracies. A more recently developed method is navigation using a magnetic map of local anomalies, where localization is carried out by fitting the measured magnetic field with the most similar pattern in the previously compiled map. Although found to be effective in static and controlled environments, this approach suffers from high noise caused by the natural magnetic background and interferences from electric equipment. In addition, periodic mapping of the area is required since new and occasionally moved ferromagnetic objects often change the magnetic map.

In previous works we have introduced localization methods based on magnetic fields in the ultralow frequency (ULF) band. These magnetic fields are generated by beacons placed at distances of up to several hundreds of meters from the receiver. Localization methods relying on assumption of pure magnetic dipole model are effective for applications in natural environments such as underground cave mapping. However, building walls with concrete reinforcements may distort the beacons magnetic field, and thereby, significantly reduce localization accuracy.

According to the principles of the present teachings, a method for indoor and outdoor navigation based on a magnetic receiver and an array of beacons, which are placed in known locations and cover the navigation area, is provided. Although the present method will be discussed in connection with indoor navigation, it should be understood that the method is not limited to indoor applications only and, thus, finds particular utility in outdoor applications or other situations where a robust, cost-effective navigation technique is needed.

The method of the present teachings employs a mobile device having a magnetometer that is capable of discriminating between different magnetic signatures to be used for localizations. That is, it should be understood that the mobile device can comprise any one of a number of suitable devices having a magnetometer or other magnetic receiver. In some embodiments, the mobile device can comprise a cellular telephone, smartphone, tablet computer, handheld navigation device, and the like. It should also be understood that the mobile device of the present teachings can incorporate other navigation systems (in addition to the present system), such as a GPS navigation system, inertial system, and the like.

The beacons produce a quasi-static magnetic field in the extremely low frequency (ELF) band which benefits from high penetration ability making it attractive for localization and tracking. Each beacon has a unique magnetic field signature, which enables the receiver to distinguish between the beacons. This signature may feature a single frequency tone, a combination of frequencies, or other type of modulation such as frequency-division multiple access (FDMA). The receiver includes a tri-axial magnetometer, a local map comprising beacon locations, and an algorithm for beacon detection and recognition. The algorithm is based on an array of lock-in detectors tuned to the beacons' frequencies. Localization is performed by recognizing the nearest beacon and retrieving its location from the beacon map. The method of the present teachings has several major advantages for indoor navigation over aforementioned techniques:

(a) The method exploits low frequency magnetic field with high penetration ability, and therefore, does not suffer from multi-path interferences. In addition, the AC magnetic field is less contaminated by high magnetic background relative to DC magnetic field.

(b) The method transforms a rather complicated localization problem into a simpler detection problem. Hence, in contrast to other magnetic localization methods, here, localization relies on detection of beacons' presence only, and does not require exact parameter estimation. This makes the method of the present teachings more robust than other methods relying on the assumption of pure dipole structure of beacon's magnetic field, which in practice is distorted by magnetic objects in the vicinity of the beacon. Thus, the method of the present teachings enables localization even with a distorted magnetic field as long as its intensity is sufficient for detection.

(c) The simple structure of the proposed detection algorithm enables real-time implementation with only scarce computational power, making it suitable for execution on smartphones and tablet computers.

(d) The method does not require a precise magnetic sensor, thus, a smartphone or a tablet computer with a low cost, low resolution magnetometer can be used as a receiver. These consumer electronic devices usually include an internal tri-axial magnetic sensor based on Hall-effect or a magnetoresistor.

(e) Using a smartphone or a tablet is very convenient for the user since both outdoor and indoor navigation can be performed using the same device. Hopefully, in the future both outdoor and indoor software applications will be combined together into a single user friendly navigator application.

A full scale operational system based on the method of the present teachings requires a suitable infrastructure. Throughout the present work we use the application of pedestrian navigation inside a mall as a study case, which enables to conveniently explain many of the tackled issues. Navigating one's way to a specific store inside the mall requires a resolution of at least 4-6 m, which is about the distance between the stores. For a beacon separation of about 4-6 m, a large building such as mall may require a deployment of dozens to several hundreds of beacons, which require physical space for installation and proper electrical infrastructure.

A system prototype has been developed in order to test the method of the present teachings in field conditions. The prototype includes a magnetic beacon and an iPad 3 is used as a magnetic receiver. Numerous computer simulations and experiments conducted at our field test prove the method to be effective in field conditions.

2. THEORY 2.1. Magnetic Beacon

A current carrying coil can be used as a magnetic beacon, where at distances larger than 3 times the coil dimension its magnetic field can be considered as having a dipole structure, $$\vec{B}(\vec{m}, \vec{r}) = \frac{\mu_o}{4\pi} \left[ \frac{3(\vec{m} \cdot \vec{r})\vec{r}}{|\vec{r}|^5} - \frac{\vec{m}}{|\vec{r}|^3} \right] \quad (1)$$

Here, the vector between the center of the coil and the measurement point is given by $\vec{r}$, $\mu_o$ is the permeability of air, and $\vec{m}$ is the magnetic moment. For an air-core coil the magnetic moment is expressed by, $$m = NIA \quad (2)$$

where N is the number of coil windings, A is the coil area and I is the current flowing through the coil. Using an alternating current (AC) enables to set the specific magnetic signature for every beacon. For simplicity let us assume here that every beacon produces a magnetic field with its single frequency, expressed by, $$\vec{B}(t) = \vec{B}_l \cos(2\pi f_l t + \phi_l) \quad (3)$$

where $\vec{B}_l$ and $\phi_l$ are the magnitude and phase pertaining to frequency $f_l$, respectively.

At distances smaller than the wavelength, the generated magnetic field can be considered a quasi-static field, which enables it to be modeled by (1) rather than as an electromagnetic wave. Notice that for frequencies in the ELF band, i.e., 3-30 Hz, the corresponding wavelengths are 100,000-10,000 km, respectively.

2.2. Beacon Detector

The magnitude $\vec{B}_l$ can be estimated using a triple of lock-in detectors, each detector is associated with a specific magnetometer axis as depicted in FIG. 1. Notice, that the non-coherent approach is adopted here since it does not require the phase $\phi_l$ for the reference signal. A low-pass filter (LPF) is required to suppress out-of-band interferences, where the narrower the LPF bandwidth the better selectivity is obtained.

In order to obtain invariance to receiver orientation, we use the total-field signal, $B_t$, which is calculated from the components of the magnetic field in each direction, $B_{tx}$; $B_{ty}$; $B_{tz}$, using, $$B_t = \sqrt{B_{tx}^2 + B_{ty}^2 + B_{tz}^2} \quad (4)$$

Hence, using all three components to calculate the total-field allows localization without restrictions on receiver orientation, which is essential for on-the-move localization. The components are estimated using three separate non-coherent lock-in detectors, all tuned to the frequency $f_t$. The total-field signal is compared to a predetermined threshold, $\tau$, in order to recognize the presence of the specific single tone.

Figure 2:
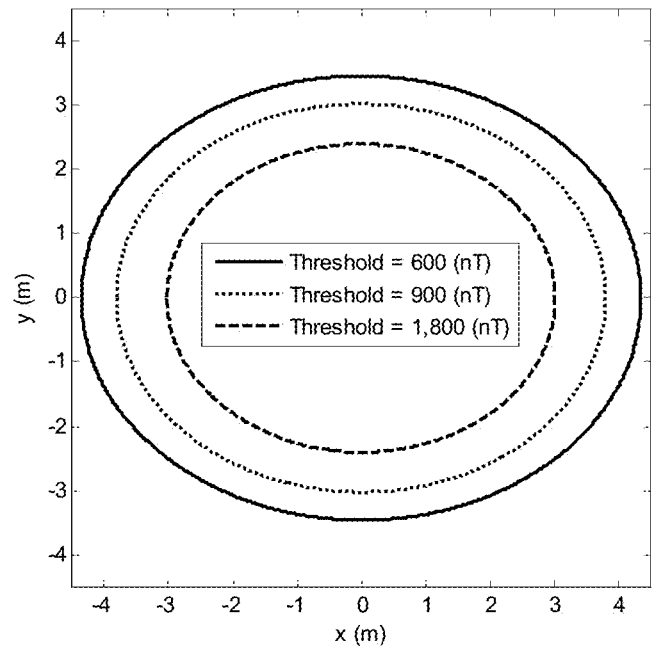

The value of the threshold governs the maximal detection distance, the larger the threshold the smaller the detection range. FIG. 2 has been obtained using (1) for a dipole with a horizontal magnetic moment. From (1) we see that when $\vec{r}$ is perpendicular to $\vec{m}$ the expression for the magnetic field may be simplified to $B = \mu_0 (4\pi)^{-1} mr^{-3}$ whereas for the case where $\vec{r}$ is aligned with $\vec{m}$ the magnetic field is exactly twice larger. Hence, the detection zone can be approximated by a prolate ellipsoid, with semi-minor axes of length D, and a semi-major axis of length $$\sqrt[3]{2} D$$

where the semi-major axis is in the direction of the coil's magnetic moment. In case of high signal-to-noise ratio (SNR), where noise influence can be neglected, we can define the minimal detection range, D, using the above simplified form of (1), $$D = \sqrt[3]{\frac{\mu_0 m}{4\pi\tau}} \quad (5)$$

Hence, at distances farther from the beacon than D the magnetic field is smaller than the threshold, $\tau$. However, presence of high magnetic noise may considerably change detection range.

2.3. Magnetic Noise and Interference

Figure 3:
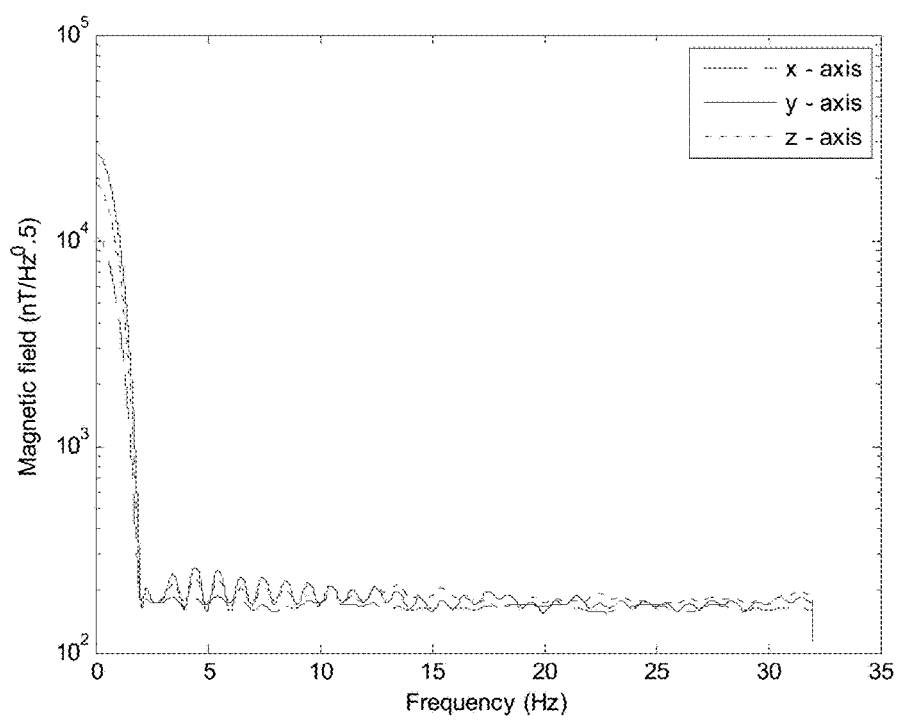

Magnetic noise and interference may cause false alarms and limit the detection range. FIG. 3 depicts the spectral density of the magnetic field components measured in a typical office.

Figure 4:
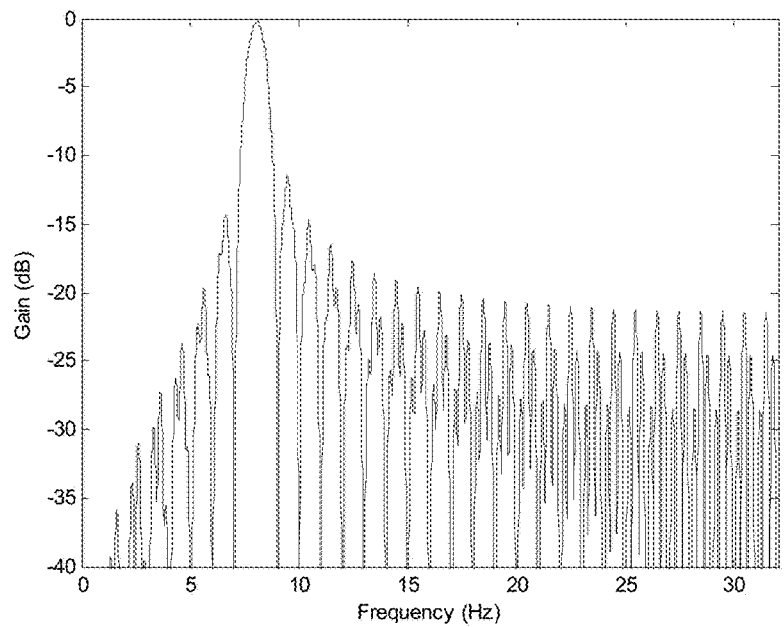

For a moving receiver, maneuver influences should also be taken into account, where the changing angle between the sensor axes and the Earth's magnetic field may produce interference. In order to mitigate such interferences we add a high pass filter (HPF) as a prefilter to the lock-in detectors. In many cases, implementing the HPF using derivation is simple and effective for reduction of maneuver interference. However, it may cause some degradation in overall system performance, i.e., increase of false alarms and misdetections. In case of high SNR the degradation in system performance is tolerable. Otherwise, a filter with higher cutoff characteristics should be implemented. We have used a simple first order Butterworth IIR HPF digital filter, with a cutoff frequency of 5 Hz. The obtained coefficients are {1,_1} for the numerator, {1,_0.599} for the denominator, and 0.799 for the gain. Together with simple implementation this prefilter is found to be effective in mitigating maneuvering interferences and even improving system performance by suppressing out-of-band low frequency noise. FIG. 4 depicts the frequency response of the combined HPF prefilter together with the lock-in detector implemented in software. Here, the LPF is implemented by a simple summation, where the integration period, T, controls the bandwidth of the filter. Naturally, larger integration periods result in narrower bandwidths.

2.4. System Layout

Figure 5:
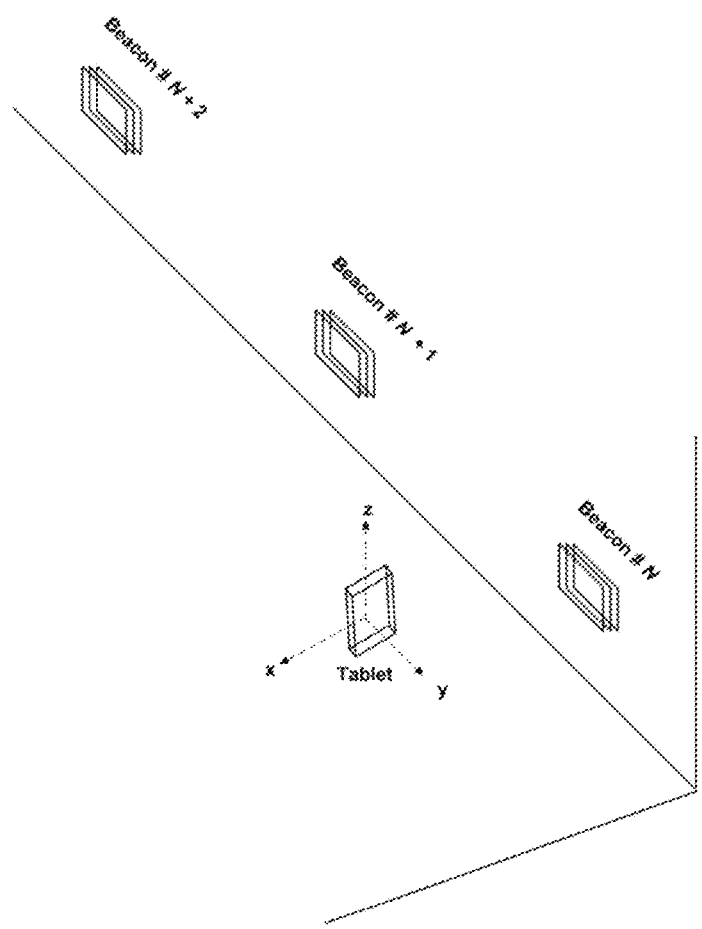
FIG. 5 illustrates a typical deployment of magnetic beacons along a corridor.

In order to use the method of the present teachings for navigation inside a building such as a mall, the building needs to be covered by a network of L magnetic beacons each with its unique magnetic signature. The beacon arrangement somewhat resembles a cellular network, where at every spot at least one of the beacons should be detected by the receiver. Nevertheless, from a practical point of view, a few small uncovered areas is tolerable, since while moving, the receiver will soon come to a position where it can detect a beacon, and update its location. Hence, for a practically full coverage, the beacons should be separated by a distance of about 2D, where D is the minimal detection range. Even in case of a larger uncovered area the system will not collapse, but rather the receiver will continue to think that it is still in the vicinity of the last detected beacon. This situation will continue until it detects a new beacon and immediately finds its new location. Obviously data fusion from other sensors such as INS (which for relatively short periods does not suffer from significant drift errors) already included in the smartphone or the tablet may help to navigate inside the uncovered area. In case more than one beacon is detected, a decision should be made which beacon is the nearest. Choosing the beacon with the strongest signal may be a simple and effective criterion. FIG. 5 depicts a typical corridor network, where beacons are deployed along both sides of the corridor. Alternatively, the beacons can be installed either under floor or in the ceiling. In case the building has several floors, each floor should be covered separately. From (1) we see that the magnetic field along the direction of the magnetic moment is twice as strong as the magnetic field at the same distance but perpendicular to the magnetic moment direction. Thus, deploying beacons with horizontal magnetic moment enables larger detection range than vertical magnetic moment. For maximal signal strength, beacons height over the floor, h, should be about 1-1.5 m corresponding to a person holding a smartphone in his hands and navigating by looking at the screen.

2.5. System Performance

In order to characterize system performance we introduce two indexes, the mean time between false alarms (MTBFA), tFA, and the mean distance between misdetections (MDBMD), dMD. Since the beacon detector throughput rate is limited by 1/T, where T is the integration period defined above for the LPF, the MTBFA is defined by, $$t_{FA} = T/\text{FAR} \quad (6)$$

where FAR is the false alarms rate of a detector. Obviously, the larger the FAR the smaller is the period between false alarms. The misdetections rate, MDR, is calculated using, $$\text{MDR} = 1 - P_D \quad (7)$$

where PD is the detection probability. Hence, a misdetection occurs for every 1/MDR beacons in average. Thus, for beacons separation of 2D the MDBMD is defined by, $$d_{MD} = 2D/\text{MDR} \quad (8)$$

The MDR and FAR used to calculate MTBFA and MDBMD in (6) and (7) are applicable for the case of a single beacon producing a single frequency magnetic field. For a system with L beacons, the receiver should employ L different beacon detectors, each tuned to a specific beacon frequency. At each instant of time the receiver detects at least one nearby beacon. Assuming that the other L−1 detectors may produce false alarms, the overall FAR increases by a factor L−1, decreasing the overall MTBFA, $$t_{FAO} = t_{FA}/(L-1) \tag{9}$$

Hence, in case a large number of beacons are required to cover the navigation area, the MTBFA may be noticeably reduced. Another consideration is the computational power required by the receiver to run a large number of beacon detectors in parallel. Moreover, the low sampling rate of devices such as smartphones and tablets, limits the bandwidth, and thereby, the number of possible beacons' frequencies is limited. A more efficient approach is based on allocating F different frequency channels, where each beacon produces a magnetic field comprising a combination of J frequencies. The total number of possible beacons equals the number of combinations $C_F^J$. In this case, only F detectors are required to detect L beacons, where F<<L. Any one of the other F−J detectors may produce a false alarm, and hence, the overall MTBFA is expressed by, $$t_{FAO} = t_{FAO}/(F-J) \tag{10}$$

which is larger than the MTBFA in (9). On the other hand, the probability to detect a beacon reduces to PD J, and therefore, the overall MDR increases, $$MDR_o = 1 - P_d^J \tag{11}$$

Now, the reduced overall MDBMD is evaluated using, $$d_{MDO} = 2D/MDR_o \tag{12}$$

When designing a system we desire to obtain the largest possible values for the MTBFA and MDBMD. However, from detection theory we know that the smaller the FAR the larger is the MDR, and vice versa. A tradeoff between FAR and MDR can be obtained by properly selecting a threshold value. One of the most useful techniques is to select a threshold which minimizes the overall error, i.e., the sum of FAR and MDR. However, for the method of the present teachings we find the Neyman-Pearson criterion as a more flexible choice allowing tradeoff between FAR and MDR. This criterion guarantees an upper limit on FAR, where MDR is calculated accordingly. In a similar manner it is possible to assign a threshold which limits MDR, and then FAR is calculated accordingly.

In case of an additive white Gaussian noise, the optimal threshold, the detection probability, FAR, and MDR can be computed analytically. However, the case in hand is more complicated because in practice the noise is not white Gaussian, and the calculated beacons total field is a nonlinear combination of the three filtered tri-axial magnetometer readings. Hence, we have chosen to analyze the system performance using experiments and computer simulations.

3. EXPERIMENT

3.1. Experimental Setup

Figure 6:
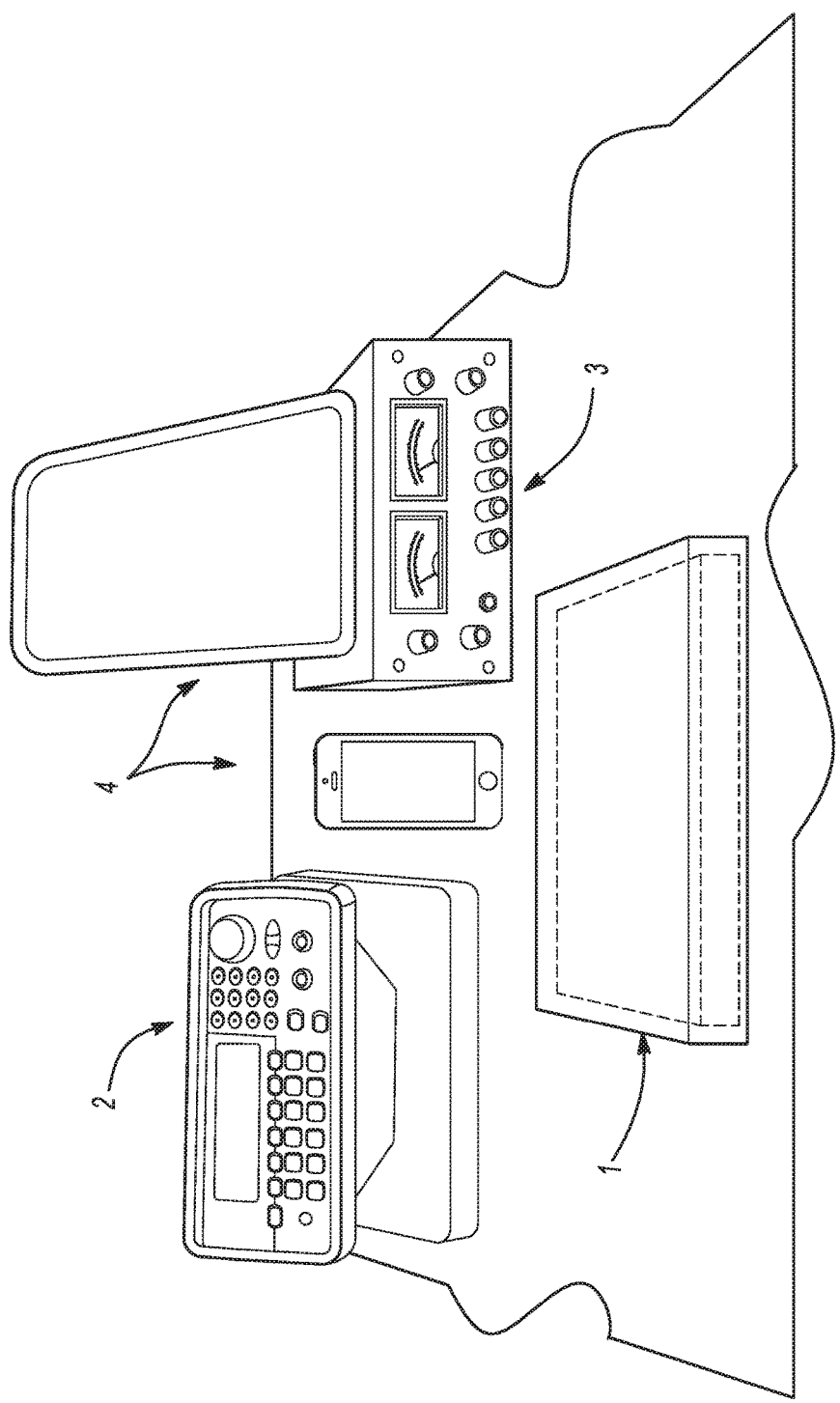
FIG. 6 illustrates a magnetic beacon comprising a coil (1), a signal generator (2), and a power amplifier (3). The magnetic receiver, or mobile device, is an iPhone or iPad (4) with an internal magnetometer, where the beacon detector algorithm is implemented in software.

In order to test the method of the present teachings we have developed a system prototype, which includes a beacon and an iPad 3 tablet computer used as a magnetic receiver. The beacon in FIG. 6 is a coil comprising 100 turns of a copper wire wounded on a rectangular 0.5 m by 0.5 m wooden frame. The coil is fed by a signal generator through a power amplifier providing a current of 10 A, which results in a magnetic moment of about 250 Am$^2$. The coil's resistance is about 1.6 Ohm, and power consumption is about 160 W.

The receiver is realized as a software application running on the iPad 3. This software application allows the testing of the method of the present teachings and does not include all the features required for a full scale navigation system. Naturally, a software application for the full scale system may be developed to run much faster and more efficiently relative to our test software. The application acquires readings of three orthogonal magnetic sensors at a sample rate of 64 samples/s. The data are processed using three detectors, where each of them is tuned to a different beacon frequency. For the experiment we have used single-tone beacon frequencies of 6 Hz, 8 Hz, and 10 Hz. A beacon detector tuned to one of these frequencies does not suffer from intermodulation interferences thanks to high out-of band attenuation of more than 40 dB, as depicted in FIG. 4. Since the beacon detector implementation in software does not involve any heavy computational burden, an integration period of 1 s allows to get 1 s output update rate. The outputs of the lock-in detectors are then compared to a predetermined threshold. The lock-in detector with the strongest output signal which rises above the threshold corresponds to the nearest beacon.

Figure 7:
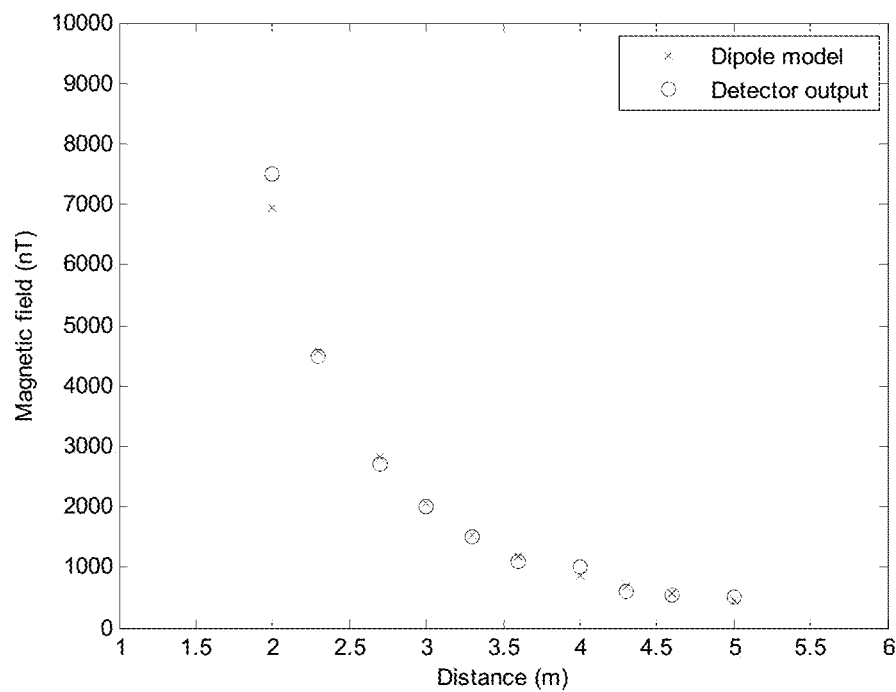
FIG. 7 is a graph illustrating the beacon detector output signal acquired at various distances in the direction of the magnetic moment.
Figure 8:
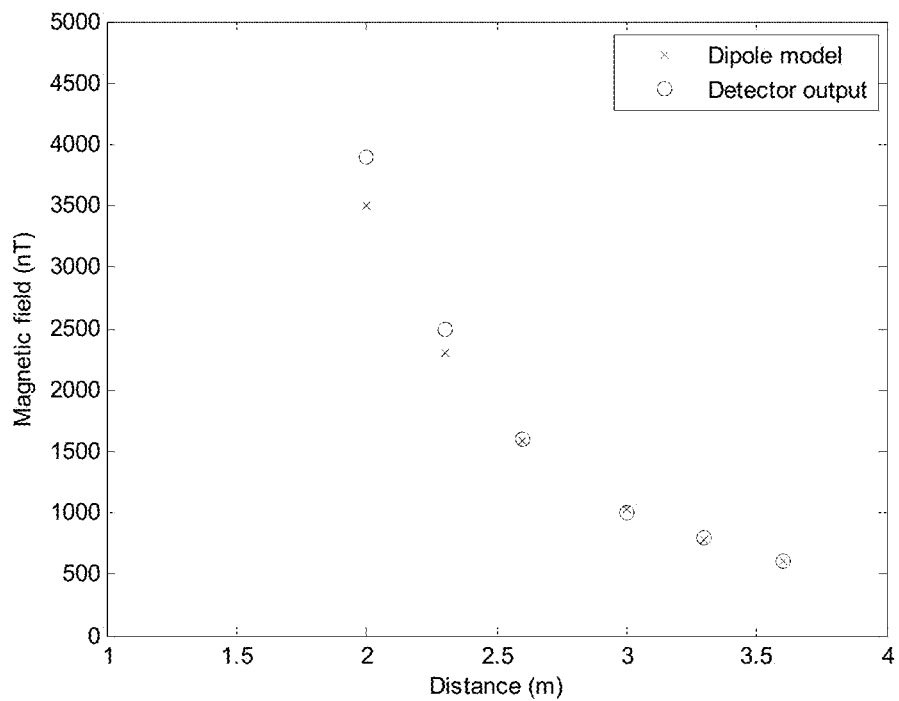
FIG. 8 is a graph illustrating the beacon detector output signal acquired at various distances in the horizontal plane perpendicular to the direction of the magnetic moment.

As a preliminary test, we have measured the beacon's magnetic field in the direction of its magnetic moment, and in the direction perpendicular to the direction of its magnetic moment. FIGS. 7 and 8 depict the measurements results, which are very close to the dipole model in (1). Notice that at distances shorter than 2-2.5 m the difference between the measured field and the dipole model field are larger. Nevertheless, the large magnitude of the field enables good detection and localization.

Real-world noise has been measured for many hours in various sites. We have chosen several segments which reflect a typical scenario. Table 1 summarizes the results of magnetic noise measurements recorded at three different sites, where the measurements have been processed by the beacon detector described in FIG. 1. As expected, in most cases the magnetic noise level is the lowest inside the magnetic shield, and highest in the local mall. Relying on the measurement inside the magnetic shield we can estimate the magnetic noise of the iPad which is mainly contributed by the sensor's intrinsic noise and the noise generated by the iPad electronics.

TABLE 1

Magnetic noise measurements in various sites.

| | Magnetic noise level (nT) | | | | | | | | |
|---|---|---|---|---|---|---|---|---|---|
| | Freq. 6 Hz | | | Freq. 8 Hz | | | Freq. 10 Hz | | |
| Site | Mean | STD | Max | Mean | STD | Max | Mean | STD | Max |
| Shield | 224 | 67 | 403 | 229 | 66 | 424 | 222 | 67 | 402 |
| Office | 230 | 69 | 465 | 230 | 62 | 429 | 225 | 61 | 371 |
| Mall | 334 | 131 | 958 | 303 | 116 | 816 | 281 | 94 | 636 |

Figure 9:
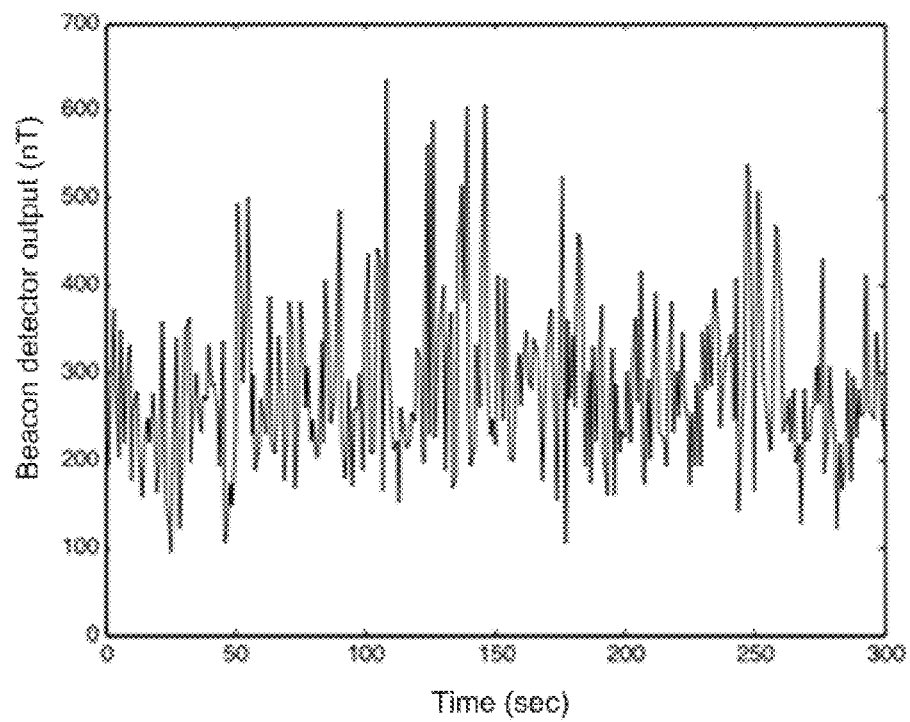
FIG. 9 is a graph illustrating the magnetic noise acquired during a stroll in the local mall including going up and down an escalator.
Figure 10:
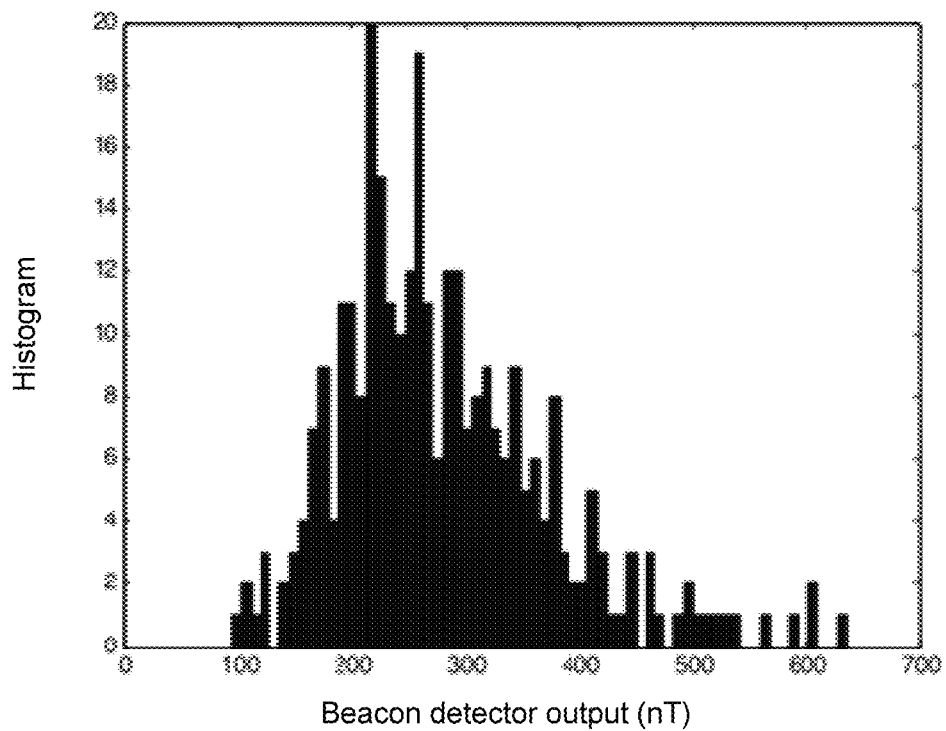
FIG. 10 is a graph illustrating the histogram of the 10 Hz beacon detector output acquired by a few minutes stroll in a typical mall (the mean magnetic noise is 281 nT, with a standard deviation (STD) of 94 nT).

FIG. 9 depicts the beacon detector output for a magnetic noise acquired during a few minutes stroll in the local mall, including going up and down an escalator. The corresponding histogram is depicted in FIG. 10.

Figure 11:
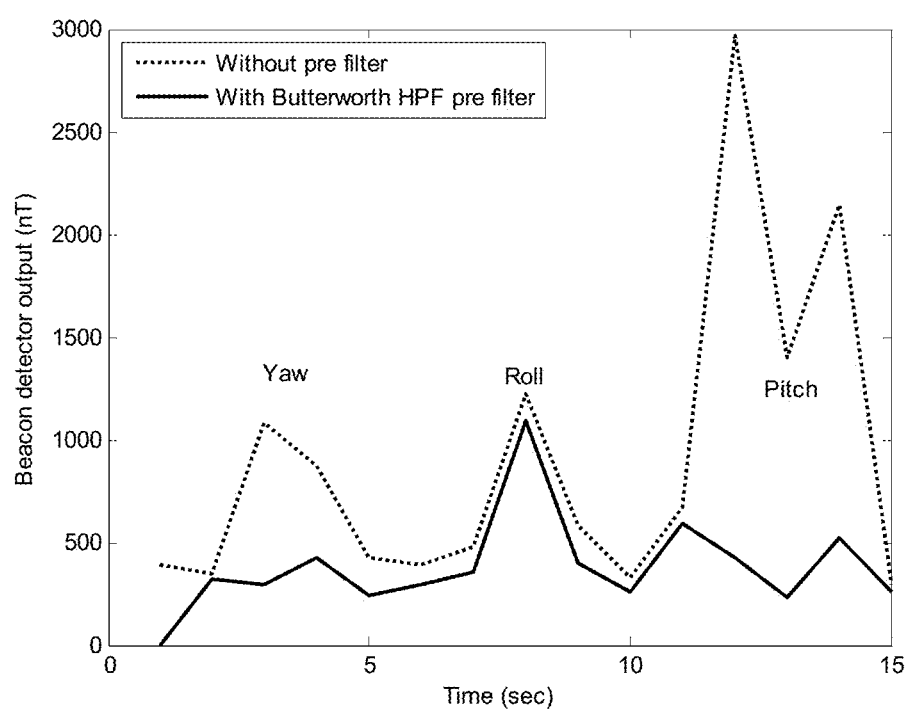
FIG. 11 is a graph illustrating the magnetic interferences caused by iPad 3 rotations.

We have also tested the ability of the method of the present teachings to deal with interferences caused by sharp maneuvers of the magnetic receiver. FIG. 11 depicts the detector output signal for fast rotations of the iPad, where yaw, roll, and pitch are used to describe rotation around the $\hat{x}$, $\hat{y}$, and $\hat{z}$ axes, respectively. As expected the prefilter mitigates the interferences caused by the rotations, especially the yaw and the pitch, whereas there is only a small influence on the roll interference. Further attenuation of sharp rolls influence requires the design of a HPF with a cutoff frequency higher than 5 Hz. However, a higher cutoff frequency inevitably reduces the bandwidth, and therefore, we have chosen to avoid it here.

4. SIMULATION

Figure 12:
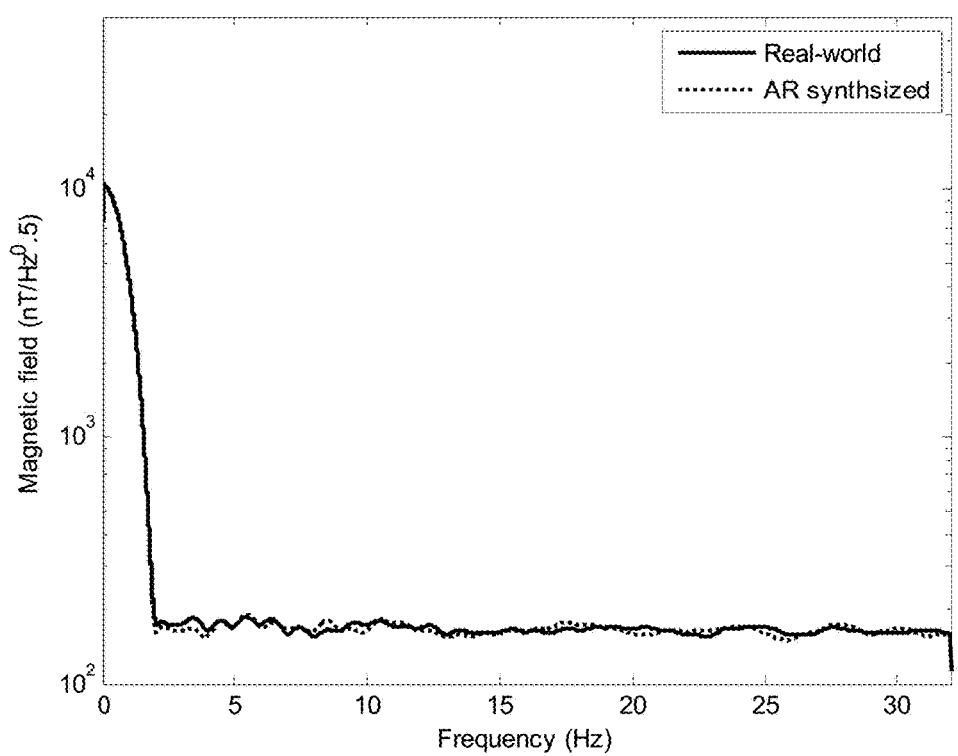
FIG. 12 is a graph illustrating the spectrum of a real-world magnetic noise acquired by the iPad and the spectrum of a synthesized noise using the AR model.

A MATLAB computer simulation has been performed in order to analyze system performance. The simulation enables to test the influence of the various parameters which govern system performance, i.e., MTBFA and MDBMD. The simulation is especially important in order to gain and verify large values of MTBFA and MDBMD with a high confidence interval, which requires large amount of acquired magnetic data. For example, MTBFA of 1 h requires at least several hours of recordings depending on the desired confidence interval. The simulation emulates the beacon detector running on the iPad. The simulated detector may be fed either by synthetic or realworld data acquired by the iPad internal magnetometer. In order to avoid long recordings in a weakly controlled environment, we have synthesized magnetic noise using the autoregressive (AR) model. The model parameters have been calculated from real-world magnetic noise using the Yule-Walker equation. After several trials we have found that for a model order larger than 24, the real-world and synthetic noise spectral densities are very similar, as depicted in FIG. 12. Therefore, the detection characteristics obtained for the real-world magnetic noise and the synthesized noise should be very close. It gives us an opportunity to make use of simulation as an effective tool for evaluation of system performance.

Figure 13:
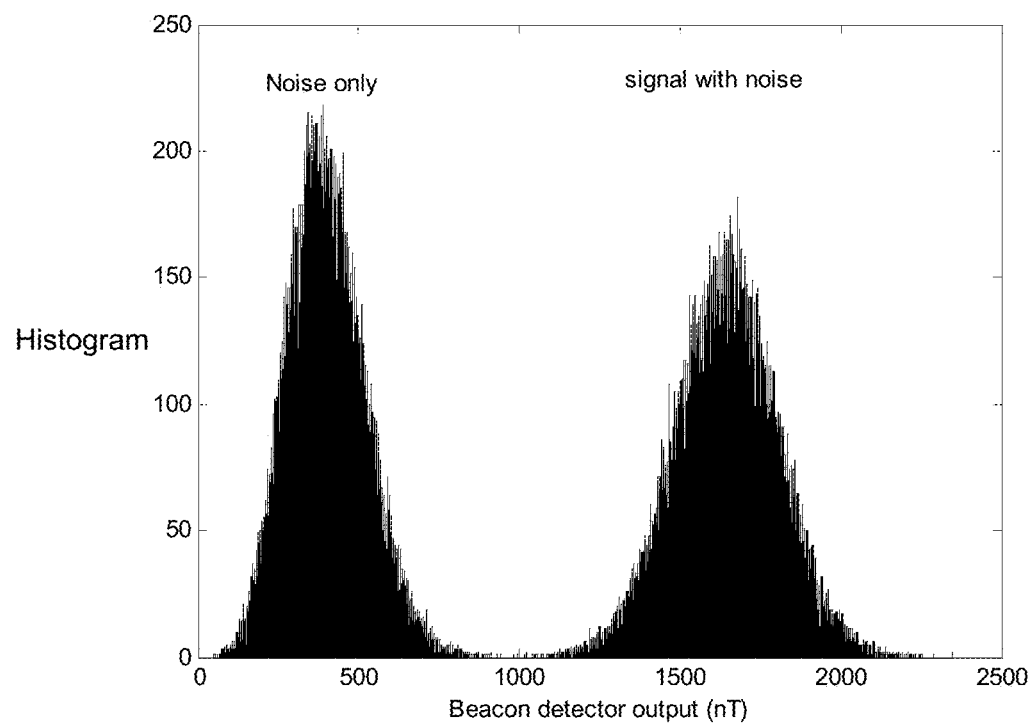
FIG. 13 is a graph illustrating the detector output histograms in case of noise only, and beacon's signal embedded in noise. The noise has been generated using the AR process with model order of 26.

As a first step for evaluating system performance, the simulation calculates the histogram of the detector's output for the case of beacon's signal embedded in noise, and for the case of noise only. FIG. 13 depicts both histograms with noise generated using the AR process with model order of 26. Then, FAR and MDR are calculated by counting the number of false alarms and misdetections, respectively.

The threshold has been calculated using the Neyman-Pearson criterion, which limits the FAR. Afterward, the MTBFA and the MDBMD have been calculated using (10) and (12), respectively. In communication theory it is customary to describe receiver performance using the receiver operation curve (ROC). In a similar manner, we have chosen to describe the beacon detector performance using the MTBFA-MDBMD curve, which employs MTBFA and MDBMD for the horizontal and vertical axes, respectively.

Figure 14:
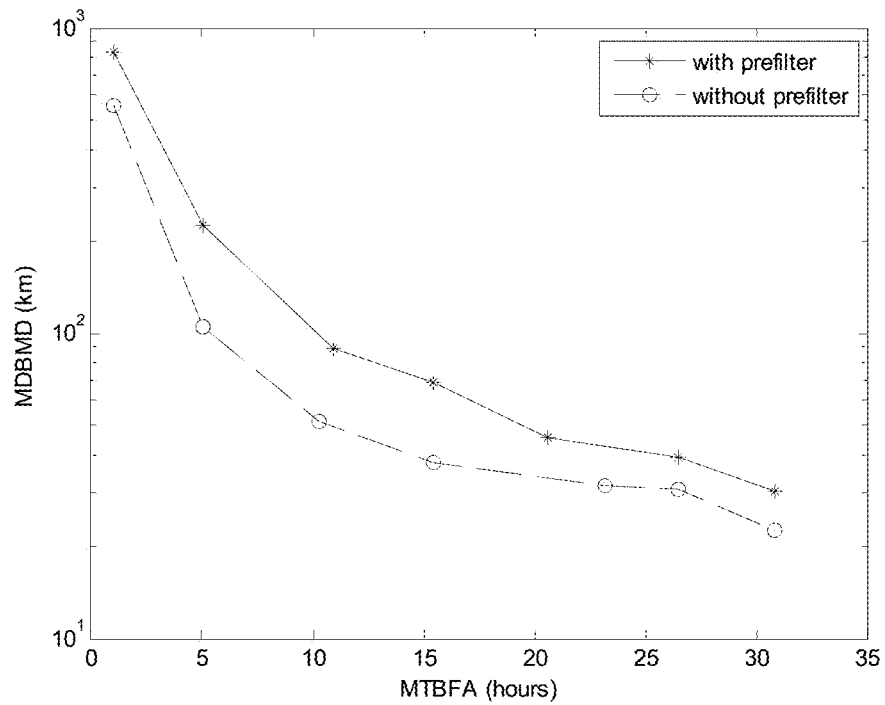
FIG. 14 is a graph illustrating the system performance obtained by simulation for the values summarized in table II (note, that using a prefilter enhances system performance).

FIG. 14 depicts system performance for simulation parameters values summarized in Table 2. These values are used as default ones for all simulations unless otherwise is specified. Notice that the prefilter which suppresses low frequency noise components, enhances system performance.

TABLE 2

| Simulation parameters. | | |
|---|---|---|
| Parameter | Symbol | Value |
| Integration period | T | 1 s |
| Beacons separation | D | 5 m |
| Prefilter | — | Yes |

TABLE 2-continued

| Simulation parameters. | | |
|---|---|---|
| Parameter | Symbol | Value |
| Sampling rate | $f_1$ | 64 samples/s |
| Test duration | — | 1000 h |
| Single tone freq. | $f_1$ | 8 Hz |
| AR model order | — | 26 |
| Freq. channels | F | 10 |
| Freq. per beacon | J | 4 |
| Total beacons | L | 210 |

In a typical mall or a shopping center, a person may pass a distance of several hundreds of meters during several hours of shopping. FIG. 14 shows that even for MTBFA of 30 h the MDBMD is larger than 20 km, and about 31 km if the prefilter is used, which means that a reliable navigation is provided. This figure enables the designer to make the proper tradeoff between the desired MTBFA and MDBMD when designing the full scale system. A threshold of about 900 pT has been selected after simulating more than 1000 h of tests. This threshold value guarantees FAR less than $2 \cdot 10^{-6}$ resulting in MDR smaller than $41 \cdot 10^{-6}$. The resulting MTBFA for integration period of 1 s is about 185 h. Accordingly, the resulting MDBMD for beacons separation of 5 m is about 122 km. We have selected 10 frequency channels in total, where each beacon uses 4 different frequencies, allowing a choice of up to 210 beacons. Thus, according to (10) and (12), MTBFA and MDBMD reduce to about 31 h and 31 km.

5. DISCUSSION

The above simulation helps to understand the influence of the main parameters on system performance. In this section we describe the role of the main parameters, recommend the proper tradeoffs, and give some tips for a full scale system design.

The integration period, T, determines the number of acquired readings used for detection with a given sample rate. The larger T, the narrower is the LPF bandwidth, resulting in better rejection of out-of-band noise. In addition, a narrow LPF bandwidth allows the use of more frequencies for beacon coding inside the working bandwidth. Moreover, the value of T affects the selection of the frequency channels. FIG. 4 demonstrates that if T=1 s, then detector spectral content resembles a comb filter with notches every 1 Hz. Generally, selecting beacons frequency channels separated by 1/T Hz, prevents intermodulation interferences. Nevertheless, too large values of T should be avoided since it results in long response time, which may limit navigation ability of fast moving receivers.

Figure 15:
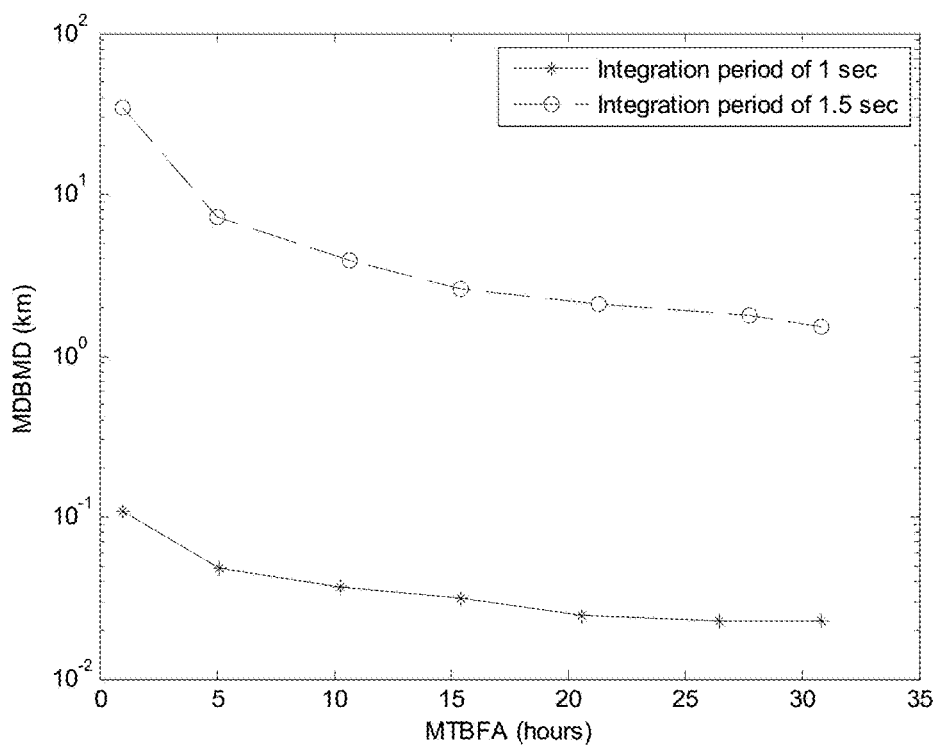
FIG. 15 is a graph illustrating the system operation characteristics for beacons separation of 5.5 m. The choice of 1.5 sec for integration period substantially improves system performance.

FIG. 15 shows system performance for beacons separation of 5.5 m. Although this configuration shows a little bit poorer results relative to 5 m separation, increasing the integration period to 1.5 s, restores good system performance. Experiments and simulations show that the recommended values for T are about 0.5-2 s. The relatively long periods are required because of the extremely low frequencies used, e.g., for a beacon with frequency of 10 Hz, only 10 cycles are acquired when a period of 1 s is used for integration. Hence, the lower limit is determined by the necessity of noise suppression, whereas the higher limit is dictated by the detection ability of fast moving receivers.

Choosing a small beacon separation results in high SNR, however, larger amount of beacons are required to cover the navigation area. On the other hand, too large beacons separation values result not only in smaller SNR, but also in poorer localization resolution. Referring to a mall or a shopping center as a study case, the required resolution is about 4-6 m, which is about the distance between the shops. Hence, a beacon separation of about 5 m is a proper tradeoff between localization resolution and total amount of beacons.

From (1) we see that the magnetic field intensity falls as a cube of the distance. A stronger beacon allows a larger threshold, which results in higher immunity to interferences. According to (2), the beacon's magnetic moment can be increased by larger coil area, larger number of turns, and higher current. However, coils are to be moderate in size to provide easy installation. As to the number of turns and coil current, they influence on power consumption, which should be taken into account when dozens or hundreds of beacons are used to cover an area. Hopefully, future smartphones and tablet computers with more sensitive magnetometers may compensate for weaker beacons.

According to (11), the misdetection rate increases with J, hence, it is desired to keep J as small as possible. Since according to (10), the false alarm rate decreases with F−J, it is also desired to keep F as small as possible. Obviously, the constraint is the number of beacons required to cover the area, which is expressed by $C_F^J$ as discussed above. In practice, we have found that for the mall or the shopping center case, coverage should be characterized in terms of length rather than area or volume. Hence, we define system coverage, R, as the product of beacons separation, 2D, and the total number of beacons, CJ F, $$R=2D \cdot C_F^J \qquad (13)$$

Figure 16:
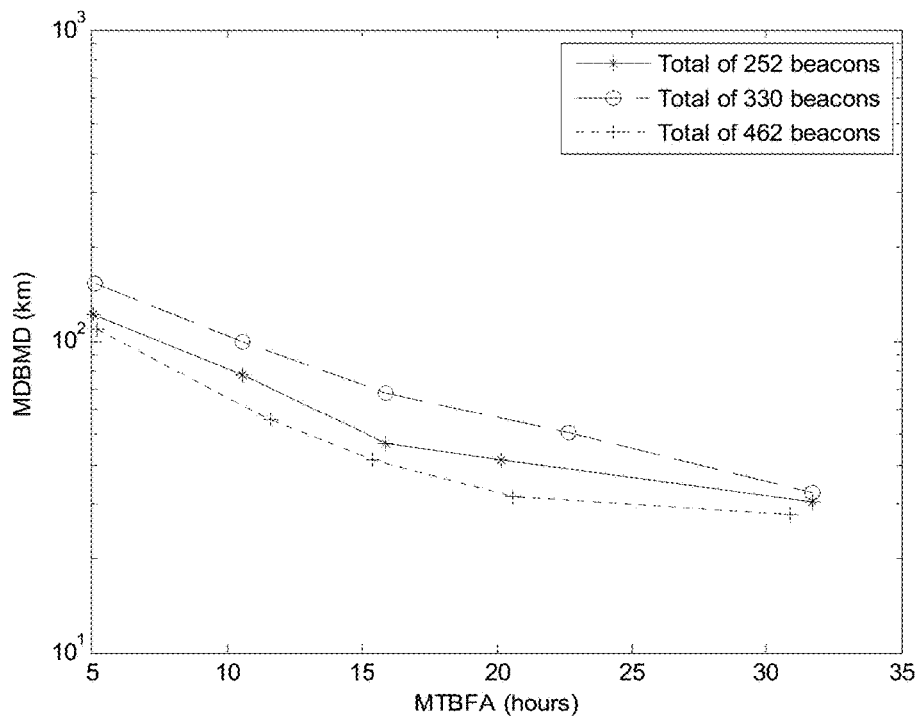
FIG. 16 is a graph illustrating that MTBFA and MDBMD decrease with the amount of beacons (nevertheless, the minimal amount of beacons is dictated by the required spatial resolution and coverability of the area).

FIG. 16 shows system performance for various combinations of F and J. Performance of the first combination, F=10, J=5, L=252, R=1260 m, is just slightly degraded relative to the performance of the default values, F=10, J=4, L=210, R=1050 m, which is depicted in FIG. 13. However, the performance is better than the second combination, F=11, J=4, L=330, R=1650 m, and the third combination, F=11, J=5, L=462, R=2310 m. Notice, that larger number of beacons can somewhat worsen error statistics though increasing spatial resolution. Nevertheless, even with 462 beacons, the system features excellent capability, where MDBMD is about 27.5 km and MTBFA of about 31 h.

6. FURTHER INVESTIGATION

In order to exploit more effectively the rather narrow bandwidth of the tablet magnetometer, a more sophisticated modulation method for the beacons may be applied. However, a simple demodulation scheme is essential, since the power consumption and computational ability of the tablet are limited.

Employing more accurate internal magnetometers will result in lower noise level, and thereby, allow the use of weaker beacons, which in addition to power saving will also better comply with safety regulations. However, to take advantage of lower noise, an intrinsic magnetic field produced by smartphone or tablet is to be reduced. In many cases this direct magnetic interference may be larger than the magnetometer noise. The required measures may include the use of non-magnetic materials, electronic board design with smallest possible current loops, using twisted pair wires whenever possible, etc. In addition, calibration of the magnetometer may compensate for residual noise and sensor imperfections such as small misorthogonalities. It is also desirable that the magnetometer acquisition unit will support a wider frequency bandwidth allowing smarter beacon modulation.

Future investigation may also include the optimization of beacons, making a proper tradeoff between number of windings, current consumption, and size. Preliminary work indicates that using a ferrite or a ferromagnetic core may lead to a more compact beacon which is easier to deploy and conceal. The power consumption of the coil used for the experiment is about 160 W, which is about just twice the power of a traditional light bulb. Though is does not seem to be wasteful, reduction of coil's power consumption is an important goal in beacons optimization when considering a full scale operational system with hundreds of beacons. Hence, taking into account the proportional increase in resistance and using (2) we see that a coil with area of 2 m² produces the same magnetic moment with 8 W of power consumption only. For instance, if the beacon's coil can serve as a frame of the poster for ad or other information, then its size of 1 m by 2 m seems to be reasonable.

In order to reduce the overall power consumption, which is an important consideration for the average shopping mall, the following measures should be taken: design of optimized beacons with minimal power to magnetic moment ratio; improving magnetometer sensitivity in order to detect even weaker beacons; using smarter navigation algorithms enabling a more sparse beacon coverage.

A navigation algorithm, which combines the presently proposed localization method together with tracking features, can further enhance system performance. Since beacons locations are known in advance, some false alarms can be filtered out in case the currently detected beacon is not a neighbor of the previously detected one. Although, misdetections may occur as a result of interferences or a damaged beacon, an occasional misdetection is tolerable in case of navigation inside a mall. In this case the moving receiver will shortly detect the next beacon and find its location enabling to continue with navigation. Moreover, a tracking ability can be used to further reduce misdetections rate. In case of a misdetection, the current receiver location can be predicted from the receiver direction of motion which is estimated using previously detected beacons. In addition, identifying receiver moving direction enables to enhance localization resolution by a factor of 2, indicating whether the receiver has already passed the beacon or not.

Adopting the above navigation algorithm provides yet another benefit. The navigation area may be partitioned into non-overlapping cells, where each cell is covered by beacons set sharing the same frequency channels. Smart arrangement of the set can be exploited to discover if the receiver has moved from one cell to another. Although localization becomes cell dependent rather than global, it allows one to reduce the number of frequency channels and thereby improve MTBFA and MDBMD.

In order to obtain submeter localization resolution, the method of the present teachings can be fused with other localization techniques based on magnetic sensors or other types of sensors such as INS, cameras, microphones, or RF receivers. In particular, fusion with methods based on dipole inverse problem solution seems to be a promising approach.

7. COMPARISON WITH OTHER INDOOR LOCALIZATION TECHNIQUES BASED ON RADIO WAVES

Localization based on radio waves is among the most potent techniques in the evolving field of indoor localization. Nevertheless, it has known shortcomings such as blocking and multi-path interferences which are typical to buildings with reinforced concrete and environments with large conductive content. In contrast, the method of the present teachings is based on the quasi-static magnetic field, and therefore, does not suffer from these types of interference. Radio waves based localization can be divided into several main categories including: mapping from Wi-Fi fingerprints, systems based on wireless sensor network, the IMES system which imitates GPS signals, and localization using radio frequency identification (RFID).

Tests with mapping from Wi-Fi fingerprints show typical indoor accuracy of 3-10 m. However, this method relies on occasional set up of Wi-Fi access points, and therefore, frequent mapping of the Wi-Fi fingerprints is required. In many cases installation of additional beacons is unavoidable, which might be challenging in an already overcrowded frequency bandwidth. Network connectivity rises privacy concerns which have to be cleared prior to commercialization.

Systems based on a wireless sensor network divide the area into subareas and assign a unique feature to each subarea through ranging the received signal strength (RSS) values from different reference points. Although, claiming to have a resolution of 1-3.5 m, the calculations require heavy duty computations, which are usually greater than the real-time capabilities of smartphones and tablets.

Similarly to the method of the present teachings, the position accuracy of IMES is the same as the beacon detection range. Hence, in order to obtain a certain accuracy both methods require the same number of beacons. The IMES benefits from using a standard GPS receiver, although software modifications might be required to handle new situations such as when multi-path interferences cause the receiver to detect two or more beacons at the same time. There is also the issue that systems transmitting in the GPS frequency band are banned in many locations including the USA.

Although RFID tags are relatively cheap and widely used, unfortunately, they are not included in most of the modern smartphones and tablets, and therefore, external hardware would need to be connected. Usually, RFID range is rather small, thus, additional hardware, e.g., a larger antenna is required for extending the range. In contrast to the method of the present teachings where a single sensor is used, RFID localization requires collecting data from multiple sensors which are located separately. Although in several scenarios an average submeter localization accuracy has been demonstrated, the STD has exceeded one meter.

Although techniques based on radio waves are currently at the forefront of indoor localization, the method of the present teachings has several considerable advantages: (a) In contrast to radio waves, low frequency magnetic fields benefit from high penetration ability which enables hiding the beacon behind a wall, above the ceiling, below the floor, inside furniture, or under a decoration. (b) Low frequency magnetic fields do not suffer from multi-path interferences, which may severely degrade the localization accuracy of techniques based on radio waves. (c) The method enables the transformation of a rather complicated localization problem into a simpler detection problem. In other words, the method does not rely on exact estimation of field intensities for 'triangulation', which is an advantage since fields and waves tend to be distorted due to nearby magnetic (or even conductive) objects. Thus, implementing the method of the present teachings requires rather low computational power. (d) No exact model of the field is required. (e) No prior mapping of the area is required, hence, the method does not rely on occasional set up of Wi-Fi access points, nor is it influenced by occasional movement of (conductive) objects in the area. (f) The method adopts a bring your-own-device (BYOD) approach, exploiting the magnetic sensor already installed inside the smartphone. Hence, no external hardware is required, in contrast to techniques based on radio waves such as RFID, which operate within frequency bands different from Wi-Fi or Bluetooth. (g) No privacy violation concerns since the smartphone is not required to be connected to a network or transmit any data, including IP, self-location, etc.

Experiments show that the obtained localization accuracy for the method of the present teachings is in the scale of the competing techniques, and can be determined by adjusting the beacons' strengths. The current adjustments reflect a possible tradeoff between localization resolution required in a shopping center and the beacons coverage which influences the overall cost. An overall cost evaluation should take into account the price of end units and equipment reliability beside the infrastructure modifications. Since none of the aforementioned methods has been yet widely employed, reliable cost evaluations are rather questionable. Nevertheless, in some scenarios the method of the present teachings can be considered as a complementary technology, which can be fused with the other techniques in order to produce a synergetic result.

8. CONCLUSION

According to the principles of the present teachings, a method for localizing a mobile device, such as a smartphone or a tablet computer, using the internal magnetometer. Localization relies on magnetic beacons deployed in the navigation area in known locations, generating an AC magnetic field with a specific frequency or modulation. A software application running on the smartphone or tablet enables the detection of the nearest beacon and thereby determine the location. An internal magnetic sensor, which is present in most smartphones and tablets, has been found to be sufficient for successful localization. Higher sensor resolution may further improve system performance. Exploiting the internal built-in sensor is a great advantage when low cost, convenience, and simplicity are important.

Experimental setup including set of beacons and a tablet computer has been used for verification of the method of the present teachings. Field experiments have validated the theory and proved the feasibility of the method. Numerous computer simulations have been used to test system performance and enabled the selection of proper parameter values. Referring to a mall or a shopping center as a study case, beacons separation of 5 m seems to be a reasonable tradeoff between localization resolution and beacon separation, enabling to localize the desired shop. Our current experimental setup ensures mean time between false alarms (MTBFA) of about 31 h, and mean distance between misdetections (MDBMD) of about 31 km. The obtained MTBFA and MDBMD values sufficiently exceed the needs of a typical shopper, which spends several hours in the mall, traveling a distance of several hundreds of meters.

Experimental results show successful localization, which paves the way for an effective indoor navigation system. Navigation inside a mall can be considered as one target application, where each floor will be covered with active magnetic beacons concealed inside or installed on the walls. In the future, the magnetic navigation software application based on the method of the present teachings may be combined with one of the available outdoor navigation applications based on GPS to form a unified application. Outdoors the system will navigate using the GPS, whereas entering the mall navigation will continue smoothly using the magnetic beacons. Thus, broadly speaking, the magnetic beacons may be considered as the indoor replacements of the GPS satellites.

The good localization results together with simple implementation make the method of the present teachings attractive for a wide range of indoor localization applications, including: pedestrian and robot navigation, in building rescue missions, vision impaired assistance, and location aware services, just to mention a few.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining position of a mobile device using magnetic beacons, comprising:
    detecting, by a magnetometer in the mobile device, a magnetic signal from a given magnetic beacon, the magnetic signal having a unique signature associated with the given magnetic beacon and the magnetic signal has a frequency in extremely low frequency band;
    storing, by the mobile device, location and an associated signature for each of a plurality of magnetic beacons in a data store of the mobile device, where each of the plurality of magnetic beacons is assigned a different associated signature;
    wherein the magnetic signals from the given magnetic beacon have
    extracting, by the mobile device, the unique signature from the magnetic signal;
    comparing, by the mobile device, the extracted unique signature to each of the signatures stored in the data store;
    identifying, by the mobile device, the given magnetic beacon from among the plurality of magnetic beacons, where the associated signature for the given magnetic beacon matches the extracted unique signature; and
    retrieving, by the mobile device, the location for the given magnetic beacon from the data store and correlating location of the mobile device with the location of the given magnetic beacon.

2. The method of claim 1 wherein detecting the magnetic signal further comprises detecting a magnetoquasistatic field using the magnetometer.

3. The method of claim 1 further comprises receiving, by the mobile device, magnetic signals from two or more magnetic beacons and selecting one of the two or more magnetic beacons as the given magnetic beacon, where the given magnetic beacon emitted the magnetic signal having the largest magnitude amongst the magnetic signals received from the two or more magnetic beacons.

4. The method of claim 1 further comprises storing a map in the data store and storing the location for each of the plurality of magnetic beacons in relation to the map.

5. The method of claim 1 further comprises storing the location for each of the plurality of magnetic beacons as coordinates in a coordinate system.

6. The method of claim 1 further comprises generating, by the mobile device, instructions for navigating a user of the mobile device based on the location of the given beacon.

7. A computer-implemented method for determining position of a mobile device using magnetic beacons, comprising:
    storing, by the mobile device, location and an associated signature for each of a plurality of magnetic beacons in a data store of the mobile device, where each of the plurality of magnetic beacons is assigned a different associated signature;
    detecting, by a magnetometer in the mobile device, magnetic signals from two or more magnetic beacons, where the magnetic signals have a frequency in extremely low frequency band;
    selecting one of the two or more magnetic beacons as a selected magnetic beacon, where the selected magnetic beacon emitted a particular magnetic signal having the largest magnitude amongst the magnetic signals detected by the magnetometer and the particular magnetic signal from the selected magnetic beacon has a unique signature associated with the selected magnetic beacon;
    extracting, by the mobile device, the unique signature from the particular magnetic signal;
    comparing, by the mobile device, the extracted unique signature to each of the associated signatures stored in the data store;
    identifying, by the mobile device, a given magnetic beacon from among the plurality of magnetic beacons, where the associated signature for the given magnetic beacon matches the extracted unique signature;
    retrieving, by the mobile device, the location for the given magnetic beacon from the data store; and
    presenting, by the mobile device, the retrieved location on a user interface of the mobile device.

8. The method of claim 7 wherein detecting the magnetic signal further comprises detecting a magnetoquasistatic field using the magnetometer.

9. The method of claim 7 further comprises storing a map in the data store and storing the location for each of the plurality of magnetic beacons in relation to the map.

10. The method of claim 7 further comprises storing the location for each of the plurality of magnetic beacons as coordinates in a coordinate system.

11. The method of claim 7 further comprises generating, by the mobile device, instructions for navigating a user of the mobile device based on the location of the given magnetic beacon.

* * * * *